Feb. 20, 1945.   D. P. ECKMAN   2,369,887
CONTROL MECHANISM
Filed Jan. 23, 1943   2 Sheets-Sheet 1

INVENTOR.
DONALD P. ECKMAN
BY
C. B. Spangenberg
ATTORNEY.

Feb. 20, 1945.   D. P. ECKMAN   2,369,887
CONTROL MECHANISM
Filed Jan. 23, 1943   2 Sheets-Sheet 2
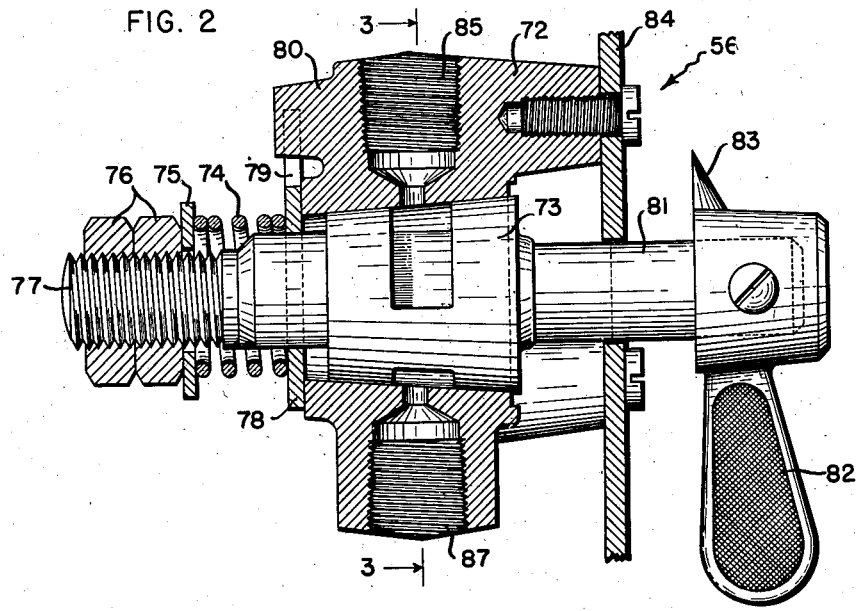
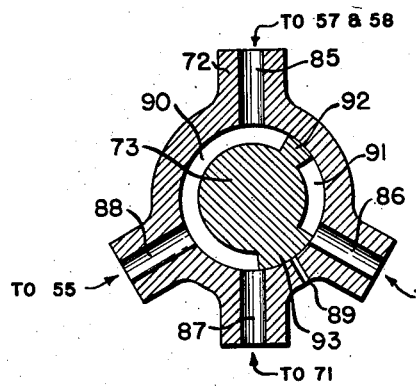
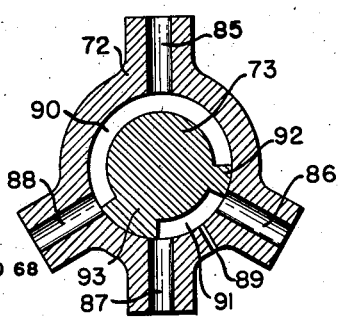
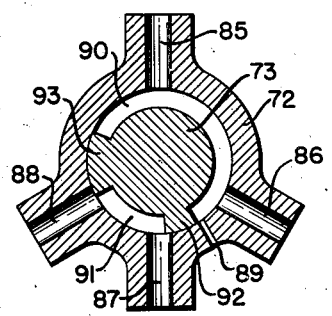
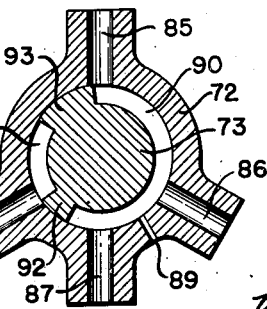
INVENTOR.
DONALD P. ECKMAN
BY
*C B Spangenberg*
ATTORNEY.

Patented Feb. 20, 1945

2,369,887

UNITED STATES PATENT OFFICE 2,369,887

CONTROL MECHANISM

Donald P. Eckman, Philadelphia, Pa., assignor to
The Brown Instrument Company, Philadelphia,
Pa., a corporation of Pennsylvania Application January 23, 1943, Serial No. 473,363

8 Claims. (Cl. 137—139)

The present invention relates to air control systems and more particularly to air control systems which contain provisions for either manual or automatic regulation of a control pressure that is applied to a control device such as a valve.

In all automatic control systems provision is made to manually control the condition if it is desired or necessary. The manual control is usually used when the system under control is being started up and while the variables being regulated are brought to their normal value. It is also frequently used when an upset occurs in the system or when some of the related variables are being changed. In any event, particularly with air control systems, it is highly desirable to have some type of mechanism by which the air pressure applied to the control valve may be regulated manually as well as automatically.

Many air control instruments are provided with a reset or droop correcting mechanism which serves to compensate for load or other continuing changes which occur to the variable or condition being controlled to cause it to differ from some predetermined normal value. During the time such a change to the condition takes place the instrument serves to continually change the controlled air pressure in a direction to compensate therefor. If the condition deviates from normal for a sufficient time the controlled air pressure will go to one of its limits. This mode of operation is desirable when the condition is on automatic control, but the instrument will operate in exactly the same manner whether the condition is being controlled automatically or manually.

During the period that the condition is under manual control and is being brought to its normal value the reset provisions of the control instrument continue to function in their normal manner even though the pressure set up by the control instrument has no effect on the control valve. Since the pressure set up by the control instrument will depend upon the time that it has taken to bring the condition up to normal, when the control is shifted from manual to automatic it may be that the pressure produced by the instrument is not the same as that which is being applied manually to the control valve. If this is so the valve will be given a sudden movement as the instrument pressure is applied to it that will tend to upset the condition.

This undesirable feature may be overcome by applying the pressure which is applied to the control valve to the reset provisions of the instrument while the condition is on manual as well as automatic control.

It is, accordingly, an object of my invention to provide an air control system in which provision is made to manually or automatically control a condition. The provisions include means whereby the pressure applied to the control valve may also be applied to the reset mechanism of of the air control instrument which is used to adjust the condition whether the condition is being controlled manually or automatically. It is a further object of my invention to provide an air control system in which the system may be changed from manual to automatic control and vice versa without altering the pressure that is applied to the control valve during the changeover. It is a further object of the invention to have a control system in which the control instrument may be entirely removed while the condition is on manual control.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 2 is a view of the manual-automatic by-pass valve, and

Figs. 3 to 6 are views taken on line 3—3 of Fig. 2 showing the positions of the valve.

Figure 1:
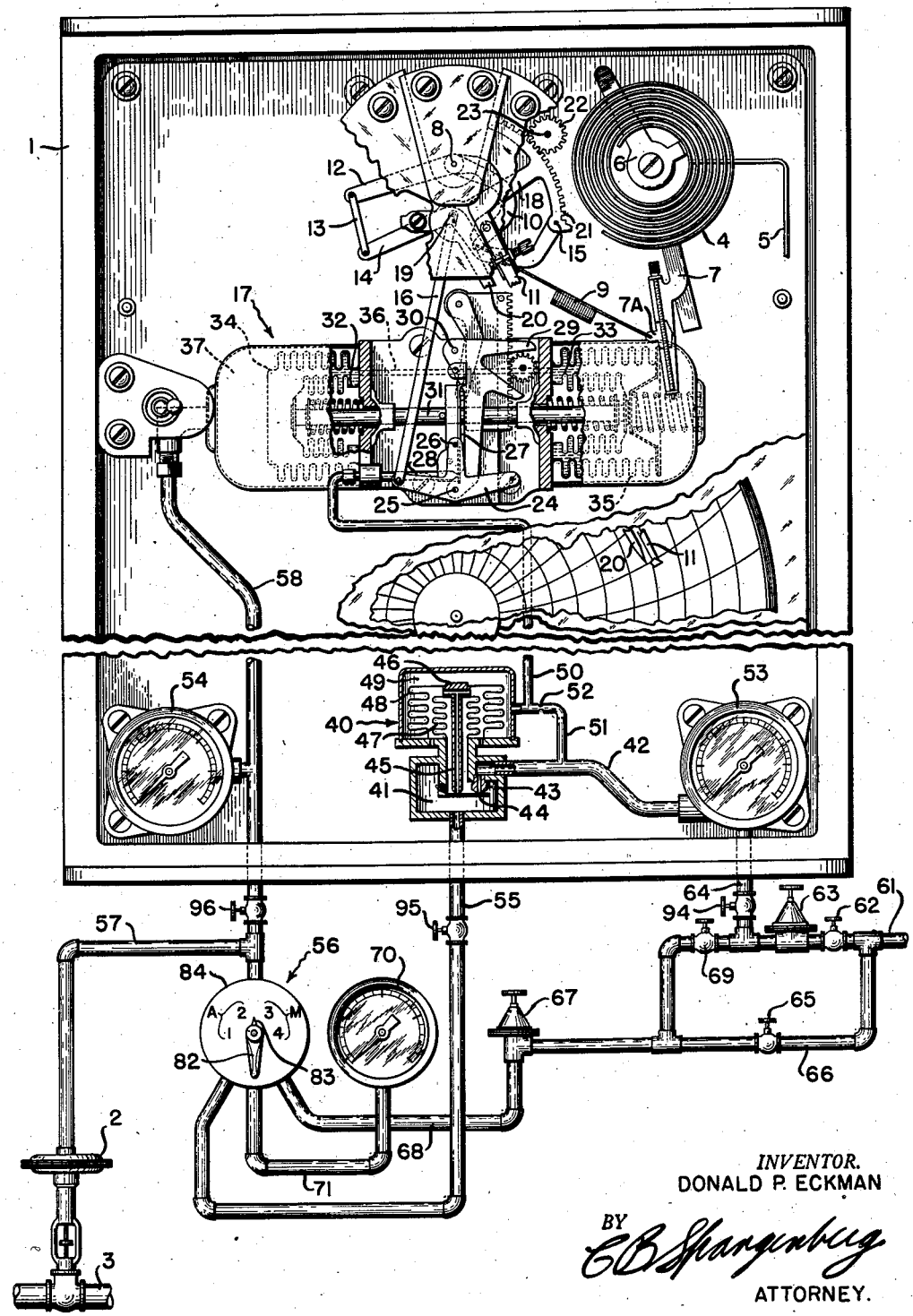
Fig. 1 is a view, partly in section, of an air control system having a conventional air control instrument with reset combined with manual control provisions of my invention.

There is shown in Figure 1 a control system in which, for example, the temperature or pressure of a variable condition may be measured by an air control instrument 1 which operates to set up a variable air pressure dependent upon the value of the condition. This pressure is applied to the diaphragm of a pneumatic valve 2 to vary the opening of the valve and thereby control the flow of a condition changing medium through a pipe 3 in which the valve 2 is located.

The instrument 1 is provided with a spiral Bourdon tube 4 that is connected by a capillary tube 5 with a condition responsive element (not shown) that is located in the region to be controlled. The Bourdon tube is mounted at its inner end to the instrument casing by means of a support 6 and is provided on its outer end with an arm 7 that is moved as the Bourdon tube changes in size due to the application of pressure to it through the capillary tube 5. The angular movements of the arm 7 give corresponding movements to an exhibiting element, including a pen shaft 8, through a link 9 which is connected at one end to a connection part 7A that is adjustable on arm 7 and at its other end to an arm 10 fastened to the pen shaft. The exhibiting element also includes a pen arm 11 and a controller actuating arm 12, both secured to the pen shaft 8.

The arm 12 is connected by a link 13 to one end of a lever 14 which is journalled at its opposite end on an adjustable fulcrum pin 15. Intermediate its ends the lever 14 is pivotally connected to one end of a link 16, which is connected to, and forms the actuating element of a pneumatic control unit 17 included in the instrument 1. The pivot 15 is supported by a control point adjusting element 18 which is pivotally connected through a pivot 19 to the framework of the instrument 1 and includes a control point index arm 20. The member 18 includes a gear segment 21 in mesh with a spur gear 22 carried by a shaft 23 which may be manually rotated to thereby turn the member 18 about the axis of its pivot 19. The resultant adjustment of the lever 14 gives the link 16 an adjustment in the general direction of its length, and thereby adjusts the "control point," or relation between the position of the arm 7 and the adjustment of the valve 2 which the control instrument 1 maintains.

Preferably, and as shown, the control unit 17 is of a well known commercial type disclosed in the Moore Patent 2,125,081, granted July 26, 1938, and including a lever 24 journalled on a pivot 25 and having an arm connected to the lever 14 by the link 16. Another arm of the lever 24 carries a flapper lifting pin 26. The latter, on a clockwise adjustment of the lever 24, moves a flapper valve 27 away from a cooperating bleed nozzle element 28, and thus reduces the throttling effect of the flapper 27 on the out-flow of air through the bleed orifice or passage through the nozzle 28. The flapper 27 is biased for movement toward the nozzle 28.

A change in the nozzle pressure produced through the flapper 27 by an initial angular adjustment of the lever 24 about its pivot 25, results in a prompt follow-up adjustment of the flapper 27 in the reverse direction, and may give rise to a delayed compensating or resetting adjustment of the flapper 27 in the same direction as the initial adjustment. The follow-up and compensating adjustments of the flapper are directly due to angular adjustments of a lever 29 which carries the pivot pin 25 and is pivotally supported by a pivot pin 30. A rod 31 which connects the movable ends of opposed inner bellows members 32 and 33 acts on the lever 29 to give the latter angular adjustments when the rod is given a longitudinal movement in one direction or the other. Each of the elements 32 and 33 forms a wall of a liquid filled space within corresponding outer bellows elements 34 and 35, respectively. The liquid filled space between the bellows elements 32 and 34 is connected to the liquid filled space between the bellows elements 33 and 35, by a restricted passage through a connecting pipe 36.

As shown, there is a booster or pilot valve 40 cooperating with the control unit 17 that is provided with a chamber 41 that is supplied with air under a suitably constant pressure through a pipe 42 and a small nozzle or orifice 43 that leads into the chamber. This nozzle is closed by a valve 44 which is spring biased in a closing direction and which valve also serves to normally close an exhaust nozzle 45 that is mounted on a member 46 which serves to join the closed ends of a pair of bellows 47 and 48. These bellows are attached at their open ends to an extension of the casing forming the chamber 41 and the space between them communicates with the atmosphere through suitable openings so that air exhausted through the nozzle 45 may escape. The outer bellows 48 is covered by a casing to form a chamber 49 that is connected with the nozzle 28 by means of a pipe 50. This chamber and the nozzle are supplied with air through pipe 51 that is connected to the pipe 42 and which is provided with a suitable restriction 52 to limit the flow of air to the chamber and nozzle.

The booster valve 40 operates to maintain a control pressure in the chamber 41 which is in a proportion to the nozzle pressure in the chamber 49, equal to the proportion of the maximum cross sectional area of the bellows 47 to the maximum cross sectional area of the bellows 48. On an increase in the nozzle pressure acting on the bellows 48, the latter contracts and through the tubular stem forming the exhaust nozzle 45 moves the valve 44 away from its normal position in which it engages the nozzle 43 and opens the axial passage through said nozzle. When the flapper 44 is thus moved away from the nozzle 43, air flows through the latter from the pipe 42 into the chamber 41, until the pressure in the latter is increased sufficiently to restore the normal ratio between that pressure and the nozzle pressure in the chamber 49, and thereby expands the bellows 47 and 48 sufficiently to permit the flapper 44 to again close the passage through the nozzle 43.

Conversely, on a decrease in the nozzle pressure transmitted to the chamber 49, the bellows elements 47 and 48 elongate and the exhaust nozzle 45 has its lower end moved out of engagement with the flapper valve 44. This permits air to escape from the chamber 41 through the bore of the nozzle 45 and a channel in the connection part 46 through which the upper end of said bore is in communication with the space between the bellows elements 47 and 48. As previously stated, that space is in free communication with the atmosphere through ports between the bellows elements.

Customarily, as shown, the instrument 1 includes pressure gauges 53 and 54 which respectively indicate the control pressure in the pipe 42, and the air supply pressure transmitted through a pipe 55 to the control valve 2 and the control unit 17.

In the operation of the system thus far described, a movement of the flapper 27 toward the nozzle 28 due to an increase in the value of the condition being measured will cause an increase in the pressure of the air in chamber 41. This pressure is applied through pipe 55, a manual-automatic by-pass valve 56, to be described in detail below, and pipes 57 and 58 to the control valve 2 and the chamber 37 of the control unit 17, respectively. The valve 2 is therefore adjusted as the condition varies. The increase in air pressure transmitted to the chamber 37 results in a movement of the rod 31 to the right as a result of the action of the liquid filled bellows system.

This movement to the right carries the flapper away from the nozzle just enough to stabilize the pressure at the new value and to maintain the control valve in its new position. Such action produces a definite control valve position for each new position assumed by the instrument pen. It constitutes a simple throttling control in which the pen would have to remain above the control index in order to maintain the higher pressure on the control valve.

If the pen is to be returned to the desired position on the chart, or the condition brought back to normal it is necessary to further increase the pressure on the control valve. This is accomplished through the automatic reset provisions. As was noted, the liquid fill between the large and small bellows on the left is connected to the liquid between the bellows on the right by a restricted passage. The two small inner bellows are spring loaded and will return to their normal position when the liquid pressure on the left hand unit has been equalized with the liquid pressure on the right hand unit by the flow of liquid from left to right. As the pressures are equalized the connecting rod 31 moves to the left and the flapper 27 again begins to cover the nozzle 28 thereby increasing the air pressure the correct amount to bring the temperature back to the control point. It is inherent in the unit that the control pressure will continue to build up slowly or fall off slowly until it has reached its limits, as long as the condition is above or below the control point, respectively.

Even if the control valve 2 is being operated by a manually regulated pressure the pilot valve 40 would operate in the manner above described. Therefore, if the condition has had its value changed manually and is subsequently shifted to automatic control the instrument would act as if the condition had deviated from the control point, and would apply a different pressure to the valve from that which is needed. This defect in shifting from manual to automatic control may be overcome by applying the same pressure to the reset provisions of the instrument as being applied to the control valve at all times, whether on automatic or manual control. Also, in shifting from automatic to manual control the manually operated pressure regulator must be adjusted to apply exactly the same pressure to the control valve as is being applied by the instrument before the change-over takes place. Otherwise the valve position will be changed with a consequent upset to the condition.

In order to provide the above described operation the invention includes a manual-automatic by-pass valve and a piping arrangement now to be described.

Air is supplied to the system from a suitable source of supply through the pipe 61, hand valve 62 and the manually operated pressure regulator 63. This regulator is used to adjust the value of the air pressure to a standard amount, for example 17 lbs. per square inch, prior to the time it goes through pipe 64 to the pressure gauge 53 in the instrument. Air is also supplied through a hand valve 65 that is located in a by-pass pipe 66 to a second pressure regulator 67 that supplies air through pipe 68 to a port in the manual-automatic valve 56. Another hand valve 69 is placed in the pipe between 64 and 65 so that the air supply to the regulator 67 may be free from the air supply to the instrument. There is also provided a pressure gauge 70 that is connected to the valve 56 by means of a pipe 71. This pressure gauge is preferably larger and more sensitive than the gauges 53 and 54 that are located in the instrument.

Normally speaking, the instrument would be located on a panel board and the valve 56, gauge 70 and regulator 67 would be located on this same board below the instrument with their operating handles extending through the board. All of the piping which has been described above, and the pressure regulator 63, are preferably located behind the panel board so that the instrument and the pressure gauge 70 may be viewed while an operator is manipulating valve 56 and the pressure regulator 57. The manual-automatic valve 56 is shown in detail in Figure 2 and comprises a body 72 which is provided with a conical opening that receives a tapered plug 73. This plug is held tightly in place by means of a spring 74, one end of which bears against a washer 75 that is held by nuts 76 on a threaded extension 77 of the valve plug 73. The other end of this spring 74 bears against a plate 78 so that the valve plug is resiliently pulled into the opening in the valve body. The plate 78 has an extension 79 on it which engages with a projection 80 formed on the valve body to limit the rotation of this valve in either direction. The plate is suitably held from rotating relative to the extension 77 by means of a key-way or a flat on the extension 77. Projecting from the front of the valve plug 73 is a second extension 81 that has mounted on it a handle 82 having a pointer 83 formed thereon. This pointer is adapted to cooperate with suitable indicia on a plate 84 which may be the above mentioned panel board to which the valve body is attached. The valve body is provided with four ports 85, 86, 87 and 88 that are connected respectively with pipes 57 and 58, pipe 68, pipe 71 and pipe 55. The valve body is also provided with a small bleed port 89 that is located between parts 86 and 87. In order to form passageways in the valve so that air can be supplied as desired, the valve plug has formed in its surface two grooves 90 and 91 that are separated by two lands 92 and 93. Rotation of the handle 82 will, therefore, permit various of the ports to be connected with each other in order that an operation to be described below may be obtained in the air control system. It is noted that the valve plug will be held in any position to which it is adjusted by the friction between the plug and the body, and that it can be readily released by merely pulling and turning the handle 82 forward against the tension of the spring 74.

For normal automatic control, the valve is in the position in which it is shown in Figure 3. In this position the regulator 67 is closed off and the air from the pilot valve is supplied through pipe 55 and groove 90 and pipes 57 and 58 to the control valve 2 and the chamber 37 of the air control unit 17 respectively. The air from the instrument is also applied to the pressure gauge 70 which gives an indication of the pressure that is applied to the control valve and, therefore, tells the position of the control valve at all times. Furthermore, by closing the valves 65 and 69 the pressure regulator 67 can be removed from the system for cleaning or repair.

With the valve in the position shown in Figure 4 the system is still under automatic control but the pressure regulator 67 is connected to the pressure gauge 70 and the bleed port 89 is open. With the valve in this position the pressure gauge 67 can be adjusted until the pressure as indicated by the gauge 70 is equal to the pressure which is being applied to the control valve.

In Figure 5 the valve is shown in a position in which it is on manual control. That is, the pressure applied through pipe 68 from the regulator 67 is applied to the control valve 2 through pipe 57 and to the chamber 37 of the control unit through pipe 58. The bleed 89 is connected with this air supply so that there is a leak in the system at all times. The air from the instrument is applied to the pressure gauge 70 through groove 91.

The position that the valve assumes for normal manual control is shown in Figure 6 in which the air supply from regulator 67 is applied through pipe 68 to the valve and through pipes 57 and 58 to the control valve 2 to the control unit 17 and through pipe 71 to the pressure gauge 70.

When it is desired to shift the system from the automatic control to manual control with the valve originally in the position shown in Figure 3 the operator notes the pressure which is being applied to the valve as indicated by the pressure gauge 70. Thereafter, he rotates the valve to the position shown in Figure 4, which connects the air from the pressure regulator to the gauge 70 and adjusts this regulator until the pressure reads the same as that being supplied by the instrument. By quickly turning the valve between positions of Figures 3 and 4 while simultaneously adjusting the regulator 67 the pressure which is to be applied to the valve can be adjusted within the sensitivity of the gauge to exactly the pressure that is then being applied to the valve. When the two pressures are equal the operator will then adjust the valve through the position shown in Figure 5 to that of Figure 6. In the last position the system is set up for manual control.

In shifting back from manual control to automatic control the operator notes the pressure which is being applied to the valve as indicated by gauge 70 and shifts the valve from the position in Figure 6 to that in Figure 5 to indicate the pressure which is being applied by the instrument. This should be approximately the same as that being applied through the regulator 67 inasmuch as the same pressure which is applied to the control valve 2 is being applied to the chamber 37 of the control unit 17. If it is not the same, the regulator 67 will be adjusted until such time as the pressure being applied manually is equal to the pressure being applied by the instrument. The valve is then rotated through the position of Figure 4 to the position of Figure 3.

On Figure 1 of the drawings the plate 84 is shown as a circle and has marked on it the numerals 1 and 2 which correspond to the valve positions in Figures 3 and 4 respectively. In both of these positions the condition is on automatic control. The plate 84 also has numerals 3 and 4 which correspond to the valve positions of Figures 5 and 6 respectively. In each of these positions the system is on manual control. Inasmuch as the pointer 83 is between positions 2 and 3 it would indicate that the system is being shifted from automatic to manual control or vice versa. It is to be noted that the actual change from automatic to manual control occurs during the small movement of the valve between positions 2 and 3. Movement of the valve from positions 1 to 2 or from 3 to 4 has no effect on the control.

It is noted in the system disclosed above that the pressure about to be applied to the control valve can be made exactly equal to the pressure then being applied to the valve within the sensitivity of the same pressure gauge. Therefore, any discrepancy that may occur between two pressure gauges is obviated. This system permits the change of control from manual to automatic and back again without in any way upsetting the position of the control valve.

By inserting valves 94, 95 and 96 in lines 64, 55 and 58 respectively, and closing these valves the instrument can be entirely removed from the control system when the system is on manual control. Furthermore, by closing valves 62 and 69 the pressure regulator 63 may be removed from the system for calibration and repair.

In order to get a very high degree of correction in the regulation of the pressure, the valve 65 can be closed and the valve 69 opened. This permits the air supplied through the pipe 68 to be the result of two pressure regulators. The regulator 63, which is set for the maximum pressure for the system, supplies air to the regulator 67 which can reduce the pressure to whatever value is necessary.

The controlled air pressure from the regulator 67 is open through the bleed 89 to the atmosphere in three of the four positions of valve 56 so that the manual control air pressure is bleeding into the atmosphere, which permits a very accurate setting of this pressure. This is particularly true when the regulator that is used at 67 is of the type that will not hold a pressure correctly when connected to an enclosed volume. The appropriate use of the hand valves as indicated above will permit any of the elements of the system to be removed without disturbing any of the other elements. This means that a system can be kept in repair and calibration at all times without entirely closing down the control system. This is an advantage, since it is not then necessary to shut down the system when any one of the parts suffers a failure.

While in accordance with the provisions of the statutes, I have illustrated and described the best form of the invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. In an air control system, the combination of a pressure operated control valve, an air operated control instrument operative to set up a first air pressure variable in accordance with the value of a condition, a manually operated pressure regulator operable to set up a second air pressure, a pressure gauge, selector means operable to connect said first air pressure with said control valve and said pressure gauge, or to connect said second pressure with said control valve and said pressure gauge, or to connect either said first or said second pressures with said control valve and to connect said other pressure with said pressure gauge.

2. In an air control system, an air control instrument to set up a first air pressure, a pressure regulator to set up a second air pressure, a control valve, a pressure gauge, a selector valve having a casing, connections between each of said instrument, pressure regulator, gauge and control valve and said casing, and a valve plug rotatably mounted in said casing, said valve plug being so formed that said control valve may be connected with either said control instrument and said pressure gauge or said pressure regulator and said pressure gauge or can connect said control valve with said control instrument or said pressure regulator and connect the other of said control instrument or pressure regulator to said pressure gauge.

3. In an air control system, a pressure operated control valve, an air control instrument, a manually operated pressure regulator, means to selectively connect said control instrument or said pressure regulator to said control valve, and means operative to alternately indicate the output pressure of said air control instrument and said pressure regulator while said control valve is connected with either pressure and prior to the time that a shift is made from one to the other whereby the pressure that is to be applied to the valve may be adjusted to be equal to that which is presently applied thereto.

4. In an air control system, the combination of a pressure operated control valve, an automatic control instrument operative to supply a first control pressure to said control valve, a manually operated pressure regulator to apply a second control pressure to said control valve, a pressure gauge, and a selector means operable to connect either said first or said second pressure to said control valve and to simultaneously connect either of said pressures to said pressure gauge.

5. In an air control system, the combination of a manually operated pressure regulator, a pressure gauge, a control instrument, means to connect said pressure gauge alternately to said regulator and said instrument, a pressure operated control valve, said means to connect also operating to connect said valve to said instrument and said pressure gauge or to said regulator and said pressure gauge.

6. In an air control system, a control valve, an air control instrument having reset provisions, means operated by said instrument to set up a first air pressure depending upon the value of a condition and the time said condition has deviated from a normal position, manually operated means to set up a second control pressure, selector means operative to connect either said first pressure or said second pressure with said control valve, and a connection open at all times between said control valve and said reset provisions of said air control instrument.

7. In a control system adapted to be either automatically or manually operated by applying an automatically adjusted pressure or a manually adjusted pressure to a control valve, the method of changing from automatic to manual control or vice versa which consists of alternately measuring the pressure applied to the control valve and the pressure to be applied thereto by the same pressure measuring device without disturbing the pressure then applied to the control valve, adjusting the pressure to be applied to the control valve until it is equal to the pressure then applied to the said control valve, and cutting off the pressure then applied to the control valve and applying the newly adjusted pressure thereto.

8. In a control system adapted to be operated either automatically or manually by applying a pressure to a control valve, the method of shifting from automatic to manual control which consists of alternately measuring the pressure automatically applied to said control valve and a manually adjusted pressure and adjusting the latter until said pressures are equal and while the control valve is continuously operated by the automatically adjusted pressure, and then cutting off said last mentioned pressure and applying said manually adjusted pressure to said control valve.

DONALD P. ECKMAN.